United States Patent [19]

Finger et al.

[11] Patent Number: 5,032,999
[45] Date of Patent: Jul. 16, 1991

[54] MOTION SENSOR USEFUL FOR POWER ASSISTED STEERING SYSTEMS

[75] Inventors: Eugene P. Finger, Brewster, N.Y.;
Bernard W. Jalbert, Richboro, Pa.;
Thomas A. Penkalski, Broadview Heights, Ohio

[73] Assignee: Yale Materials Handling Corporation

[21] Appl. No.: 430,190

[22] Filed: Nov. 1, 1989

[51] Int. Cl.$^5$ ............................................. G01B 11/26
[52] U.S. Cl. ............................... 364/424.05; 33/1 PT; 33/1 N
[58] Field of Search ................. 364/424.05; 33/1 PT, 33/1 N; 180/79.1, 142

[56] References Cited

U.S. PATENT DOCUMENTS

| | | | |
|---|---|---|---|
| 4,492,031 | 1/1985 | Koenuma | 33/1 PT |
| 4,495,700 | 1/1985 | Ernst | 33/1 N |
| 4,549,627 | 10/1985 | Takeshima et al. | 180/142 |
| 4,552,240 | 11/1985 | Takeshima et al. | 180/142 |
| 4,598,787 | 7/1986 | Drutchas | 180/79.1 |
| 4,619,338 | 10/1986 | Higashi et al. | 180/142 |
| 4,625,411 | 12/1986 | Kashiwagi et al. | 33/1 PT |
| 4,660,036 | 4/1987 | Mosier | 340/870.29 |
| 4,747,055 | 5/1988 | Eto et al. | 364/424 |
| 4,751,649 | 6/1988 | Eto et al. | 364/424 |
| 4,773,498 | 9/1988 | Eto et al. | 180/79.1 |
| 4,803,629 | 2/1989 | Noto et al. | 364/424.05 |

Primary Examiner—Thomas G. Black
Attorney, Agent, or Firm—John H. Crozier

[57] ABSTRACT

A motion sensor which includes, in a basic embodiment, two sensing elements of any type disposed so as to detect the relative passing thereby of perturbations. The sensing elements are disposed so that they are offset with respect to the perturbations, such that the sensing elements cannot both be activated simultaneously. When one sensing element is activated, thus indicating motion, timing means starts counting and, if the other sensing element is activated within a predetermined length of time, the sensor infers that purposeful motion has been detected and may, for example, activate a power steering assist unit. The spacing of the perturbations determines the minimum degree of motion required for the motion sensor to provide an output and the timing mechanism determines how rapidly that degree of motion must occur for the motion sensor to provide the output. Thus, the spacing and time parameters may be set so that purposeful motion may be discriminated from random motion such as vibration. The sensing elements may be photodetectors, microswitches, pressure sensors, reed switches, or conductive, inductive, or capacitive proximity sensors, or of any other type. The corresponding perturbations may be arrayed on either a rotating or a linearly moving member.

26 Claims, 7 Drawing Sheets

MOTION SENSOR USEFUL FOR POWER ASSISTED STEERING SYSTEMS

BACKGROUND OF THE INVENTION

1. Field of the Invention

The present invention relates to motion sensors generally and, more particularly, to a novel motion sensors which senses purposeful movement, as opposed to non-purposeful motion such as vibration, and is especially useful when employed as a sensor in an on-demand power assisted steering system. While the sensor of the present invention is described in an embodiment in which it is so employed, it will be understood that it may be applied as well in any case in which it is desired to sense purposeful motion and, more particularly, in which it is desired to sense a predetermined degree of motion occurring within a predetermined length of time.

2. Background Art

Power assisted steering systems are well known devices for assisting the turning of wheels to effect changes in direction of motion of automobiles, trucks, and a wide range of industrial and construction equipment such as fork lift trucks, for example. A power steering assist unit typically comprises a hydraulic motor operatively connected to the steering shaft of vehicle and powered by an electric motor. In its simplest embodiment, the unit operates whenever the vehicle motor is operating.

In order to conserve energy, power assisted steering units have been developed which are activated only under certain conditions, e.g., when the steering wheel is turned, when the vehicle is moving, or when the vehicle is in a certain speed range. One problem with the first type is that purposeful motion is not discriminated and random movements such as vibration can cause the unit to cycle on and off which, in some cases, represents a large power drain; and, in the case of electric forklift trucks, the drain can exceed the traction motor in terms of peak power. The latter two types have as one disadvantage, among others, that there is no power assist to turn the wheel should a vehicle need to maneuver out of a confined space by turning the wheel when there is no vehicle motion.

Accordingly, it is a principal object of the present invention to provide a motion sensor which can discriminate between purposeful motion and random motion such as vibration.

Another object of the invention is to provide such a motion sensor which can be employed with an on-demand power steering assist unit and which does not require vehicle motion before the unit is activated.

An additional object of the invention is to provide such a sensor which does not require fine adjustments and which can be used in industrial environments.

Other objects of the invention, as well as particular features and advantages thereof, will be elucidated in or apparent from the following description and the accompanying drawing figures.

SUMMARY OF THE INVENTION

The present invention substantially overcomes the limitations of known devices and achieves the above objects, among others, by providing a motion sensor which includes, in a basic embodiment, two sensing elements of any type disposed so as to detect the relative passing thereby of perturbations. The sensing elements are disposed so that they are offset with respect to the perturbations, such that the sensing elements cannot both be "on" simultaneously. When one sensing element is activated, thus indicating motion, timing means starts counting and, if the other sensing element is activated within a predetermined length of time, the sensor infers that purposeful motion has been detected and may, for example, activate a power steering assist unit. The spacing of the perturbations determines the minimum degree of motion required for the motion sensor to provide an output and the timing mechanism determines how rapidly that degree of motion must occur for the motion sensor to provide the output. Thus, the spacing and time parameters may be set so that purposeful motion may be discriminated from random motion such as vibration. The sensing elements may be photodetectors, microswitches, pressure sensors, reed switches, or conductive, inductive, or capacitive proximity sensors, or of any other type. The corresponding perturbations may be arrayed on either a rotating or a linearly moving member.

DETAILED DESCRIPTION OF THE PREFERRED EMBODIMENTS

Figure 1B:
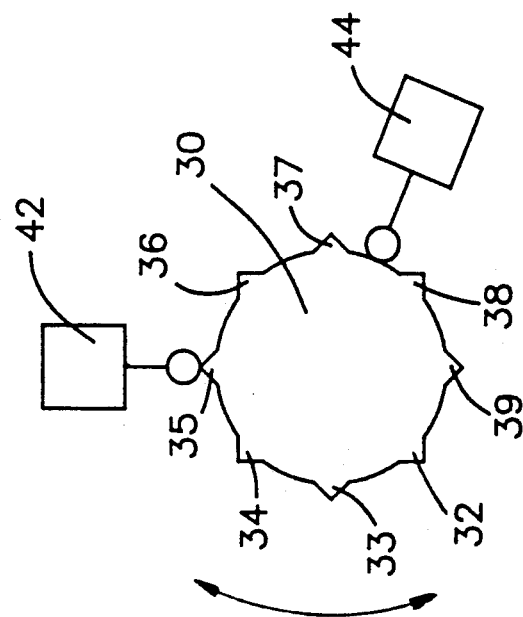
FIGS. 1(a) and 1(b) schematically illustrate examples of the arrangement of sensing elements and perturbations according to the present invention.
Figure 1A:
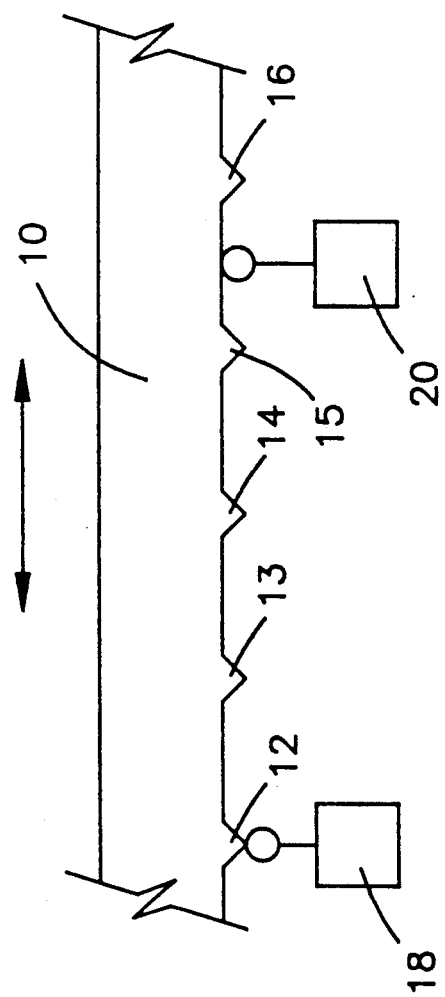

Referring now to the Drawing, FIGS. 1(a) and 1(b) illustrate linear and rotary embodiments, respectively, of the positioning of sensing elements relative to perturbations, according to the present invention.

On FIG. 1(a), a linearly movable member 10 has disposed along one edge thereof perturbations in the form of equally spaced raised portions 12-16. Fixedly disposed relative to the motion of member 10 are motion sensing elements 18 and 20. Motion sensing elements 18 and 20 may be, for example, microswitches and it can be seen that the motion sensing elements are so disposed with respect to perturbations 18 and 20 that they cannot be activated simultaneously. For example, as seen on FIG. 1, when motion sensing element 18 is activated by perturbation 18, motion sensing element 20 lies halfway between perturbations 15 and 16.

On FIG. 1(b), a rotatably movable member 30 has disposed around the circumference thereof perturbations in the form of equally spaced raised portions 32-39. Fixedly disposed relative to the motion of member 30 are motion sensing elements 42 and 44. Similarly to the arrangement shown on FIG. 1, only one of motion sensing elements 42 and 44 can be activated at any one time. Here, motion sensing element 42 is activated by perturbation 35, while motion sensing element 44 lies between perturbations 37 and 38.

Figure 2:
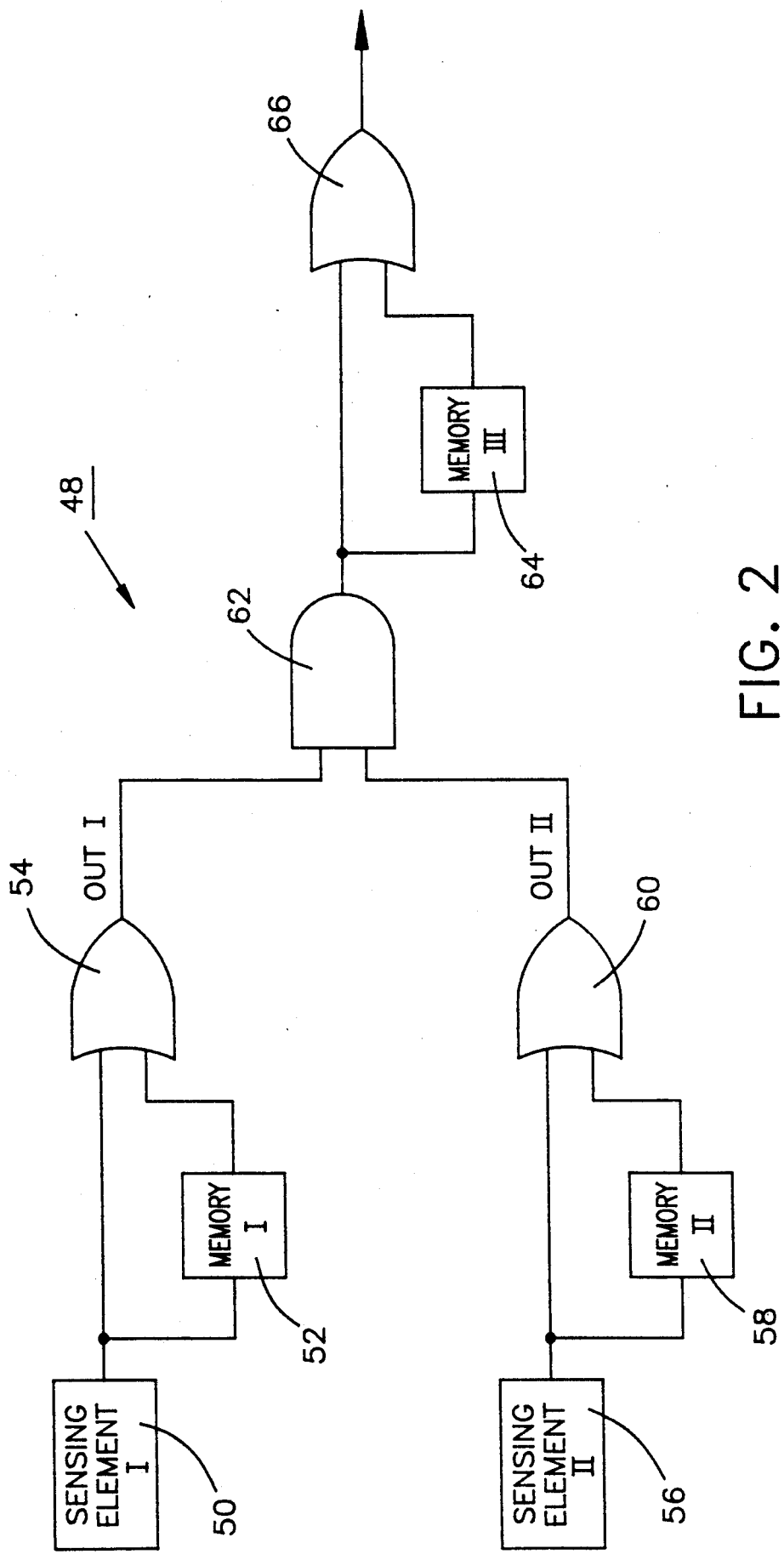
FIG. 2 illustrates schematicallY a timing sYstem according to the present invention.

FIG. 2 is a block schematic diagram illustrating the scheme of a basic timing system 48 which permits the present invention to discriminate between purposeful motion and random motion such as vibrations. Here, a first sensing element 50 provides inputs to a first memory 52 and to a first OR gate 54 the other input to which OR gate is the output of the first memory. Similarly, a second sensing element 56 provides inputs to a second memory 58 and to a second OR gate 60 the other input to which OR gate is the output of the second memory. Sensing elements 50 and 56 may be assumed to be comparable to sensing elements 18 and 20 or 42 and 44 on FIGS. 1(a) and 1(b), respectively. The outputs of first and second OR gates 54 and 60 are inputs to an AND gate 62 which provides inputs to a third memory 64 and to a third OR gate 66 the other input to which OR gate is the output of the third memory.

In operation, sensing element 50 is activated by a perturbation and provides an output which activates OR gate 54 to provide output OUT I. The output of sensing element 50 also activates first memory 52 which continues to activate OR gate 54 for the duration of the retention time of the memory. If, during that retention time, sensing element 56 is activated, OUT II will be provided from second OR gate 60 and AND gate 62 will provide an output which can be used, for example, to start a power assisted steering unit. Thus, system 48 determines if there has been a predetermined degree of motion within a predetermined time period, with the retention times of first and second memories 52 and 58 determining the minimum detectable average velocity between activation of first and second sensing elements 50 and 56. System 48, therefore, can be set to discriminate between purposeful motion, e.g., a steering wheel has been turned a minimum distance in a minimum time period, and random motion such as vibration.

To allow for the situation in which it may be desirable to maintain an output from system 48 for a minimum length of time once the minimum distance and time parameters have been satisfied, the output of AND gate 62 may be used to activate third memory 64 to maintain the output of OR gate 66 for a predetermined length of time. The retention time of third memory 64 determines the minimum detectable average velocity between coincidences and, therefore, can be set sufficiently short relative to first and second memories 52 and 58 that system 48 can respond to a very slow initial rate of movement, but increased rate of movement must be achieved for the system to continue to produce an output. Conversely, the retention time of third memory 64 may be selected sufficiently long that even a single coincidence will cause system 48 to produce an output for a relatively long period of time.

It can be seen on FIG. 1(a) that motion sensing elements 18 and 20 are spaced apart along linearly moving member 10 by 3½ times the pitch of the perturbations 12-16. Similarly, it can be seen on FIG. 1(b) that motion sensing elements 42 and 44 are spaced apart around rotatably moving member 30 by 2½ times the pitch of the perturbations 32-39. The spacings shown are arbitrarily chosen for purposes of illustration only and it is merely necessary that, when two sensors are employed with equally spaced perturbations, that the sensors be spaced apart by the relation: $[d] \times [(n) + (\frac{1}{2})]$, where d is the pitch of the perturbations and n is zero or any integer. As a practical matter, physical size of the sensors may make a spacing of ½d impossible in some applications. The pitch selected for the perturbations will depend on the minimum desired displacement to activate the timing system, with the pitch directly proportional to the minimum desired displacement.

The system is symmetrical so that it operates in the same manner in either direction.

The actual distance of travel of the moving member that a motion sensing element will be "on" also determines to a greater or lesser extent the minimum and maximum displacements for actuation of the timing system, such as timing system 48 of FIG. 2. With theoretical elements that are infinitesimal in actuation width, for example infinitesimal optical sensors of infinitesimal width cooperating with apertures of infinitesimal width, the minimum displacement which will activate the timing system with two sensors will be ½d and the maximum displacement which will activate the timing system will be 1d. Real sensors and perturbations, however, have physical widths and, other parameters being equal, as the actuation width increases, the shorter will be the minimum and maximum displacements, with the ratio of maximum-to-minimum ranging from 2 when the actuation width of the timing system is infinitesimal to infinity when the actuation width is ½d. It can be shown that the ratio of maximum to minimum displacements is given by the formula:

$$\text{Max/Min Ratio} = 1 + [1/(1 - 2k)],$$

where, k = actuation width as a fraction of d.

Figure 3:
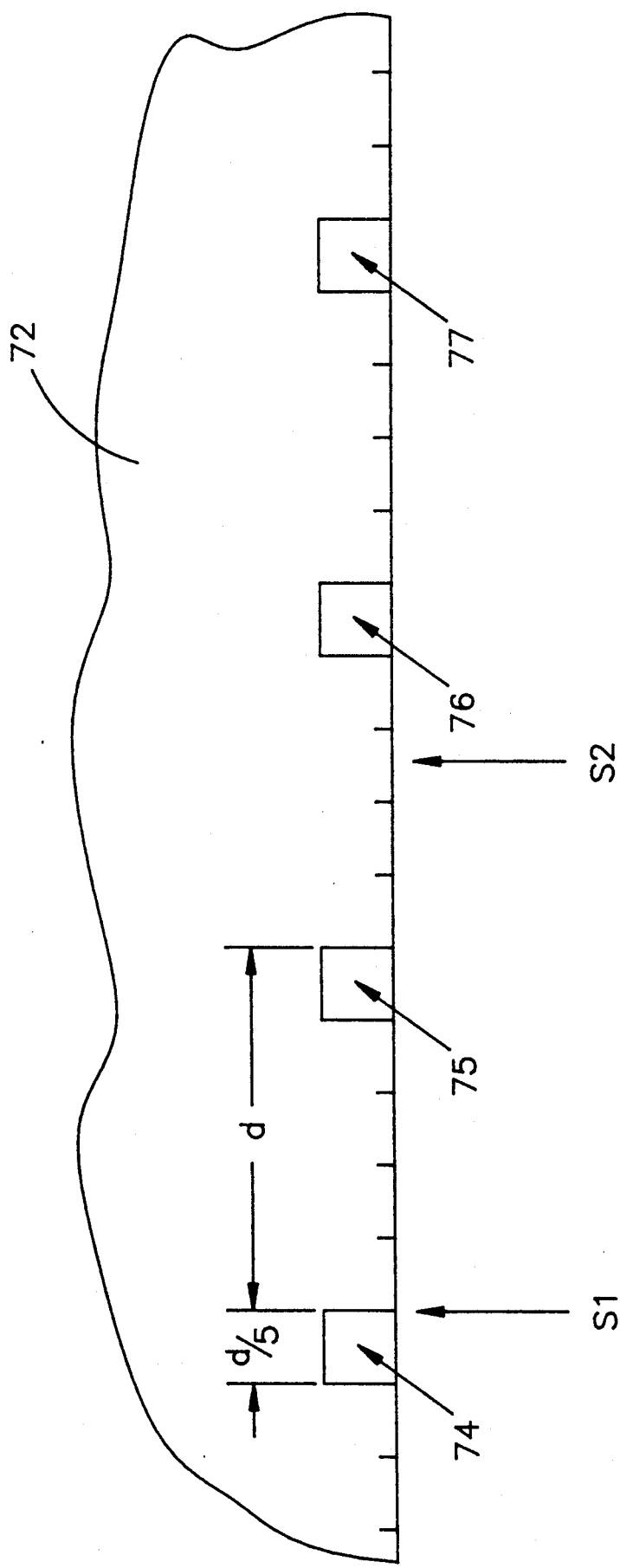
FIG. 3 is a schematic fragmentary plan view of an optical disk and sensors according to an embodiment of the present invention.

FIG. 3 is a schematic representation of the present invention as it might be applied, for example, to a sensor for a power assisted steering unit. Here, a portion of an aperture disk 72 (shown with a straightened edge, for greater clarity), which may be mounted on a steering column (not shown), has defined therein a plurality of apertures, as at 74–77, on a pitch of d length with each aperture having an effective width of d/5. The location of two sensors is indicated by the arrows at S1 and S2. It can be seen that the sensors are spaced apart by 1½d. For greater clarity, the sensors S1 and S2 are shown as points and the actuation width is shown as the width of the apertures. It can also be seen that the minimum displacement for actuation of a timing system is 0.3d: e.g., the apertures 74–77 are moving to the left, S1 is "on" and is just about to be turned "off," and S2 will be be turned "on" when aperture 76 moves a distance of 0.3d to sensor S2. Likewise, the maximum actuation displacement is 0.8d: e.g., both sensors are "off" when movement begins, the sensor at S2 will be turned "on" when aperture 76 moves a distance of 0.3d to the left, and S1 will be turned "on" when aperture 75 moves a distance of 0.8d to the left to the sensor at S1.

It will be understood that the present invention can be applied in a variety of circumstances in which it is desired to measure a predetermined amount of motion in a predetermined length of time and scales easily, for example, from thousands of revolutions per minute to revolutions per hour or even to revolutions per year by appropriate selection of the retention values for the memories in the timing system.

For an embodiment of the present invention as shown on FIG. 3 applied to a power assisted steering unit, the following parameter values have been found to be satisfactory:

| | |
|---|---|
| Diameter of disk: | 3.000 inches |
| Width of apertures: | 35 mils mechanical |
| Width of apertures: | 47 mils effective |
| Pitch of apertures: | 235 mils, or 9 degrees |
| Min. displacement: | 2.7 degrees |
| Max. displacement: | 7.2 degrees. |

The effective width of the apertures is greater than the mechanical width, due to factors such as fringing effects and the width of the sensors. The range of maximum-to-minimum displacement has been found to be quite satisfactory when the invention is applied to forklift trucks and the activation/deactivation of the power assisted steering units thereon has been found to be completely transparent to the operator of the forklift trucks.

Figure 4:
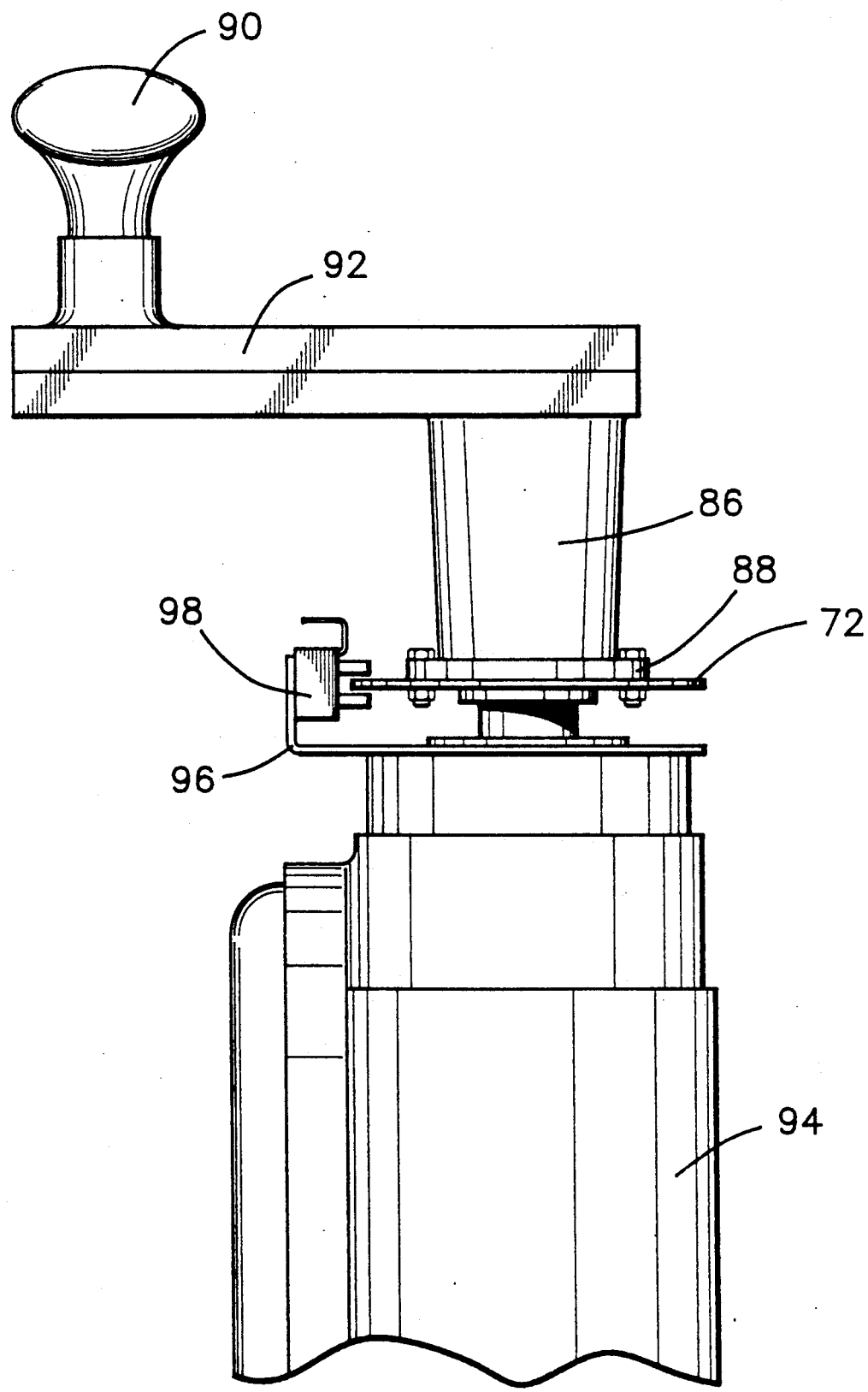
FIG. 4 is a side elevation view of an embodiment of the present invention used with a steering mechanism and power assisted steering unit on a forklift truck.

FIG. 4 shows disk 72 mounted on the steering column 86 of a forklift truck (not shown) by means of attachment to a flange 88 fixed to the steering column. Steering column 86 is rotated by means of the operator grasping a knob 90 at the one end of a steer tiller 92, the other end of which steer tiller is attached to the steering column, and moving the knob along an arcuate path. Steering column 86 is operatively connected to a hydraulic power steering unit 94. Mounted on a bracket 96 fixed to the housing of hydraulic power steering unit 94 is an optical block 98 in which are two light sources (not shown) disposed on one side of disk 72 and two light sensors (not shown) disposed on the other side of the disk opposite the light sources. The light sensors may be sensors S1 and S2 of FIG. 3. It will be understood that the light sources and light sensors are so disposed that light from the sources will pass through apertures (not shown) on disk 72 as the disk rotates with the steering column.

Figure 5:
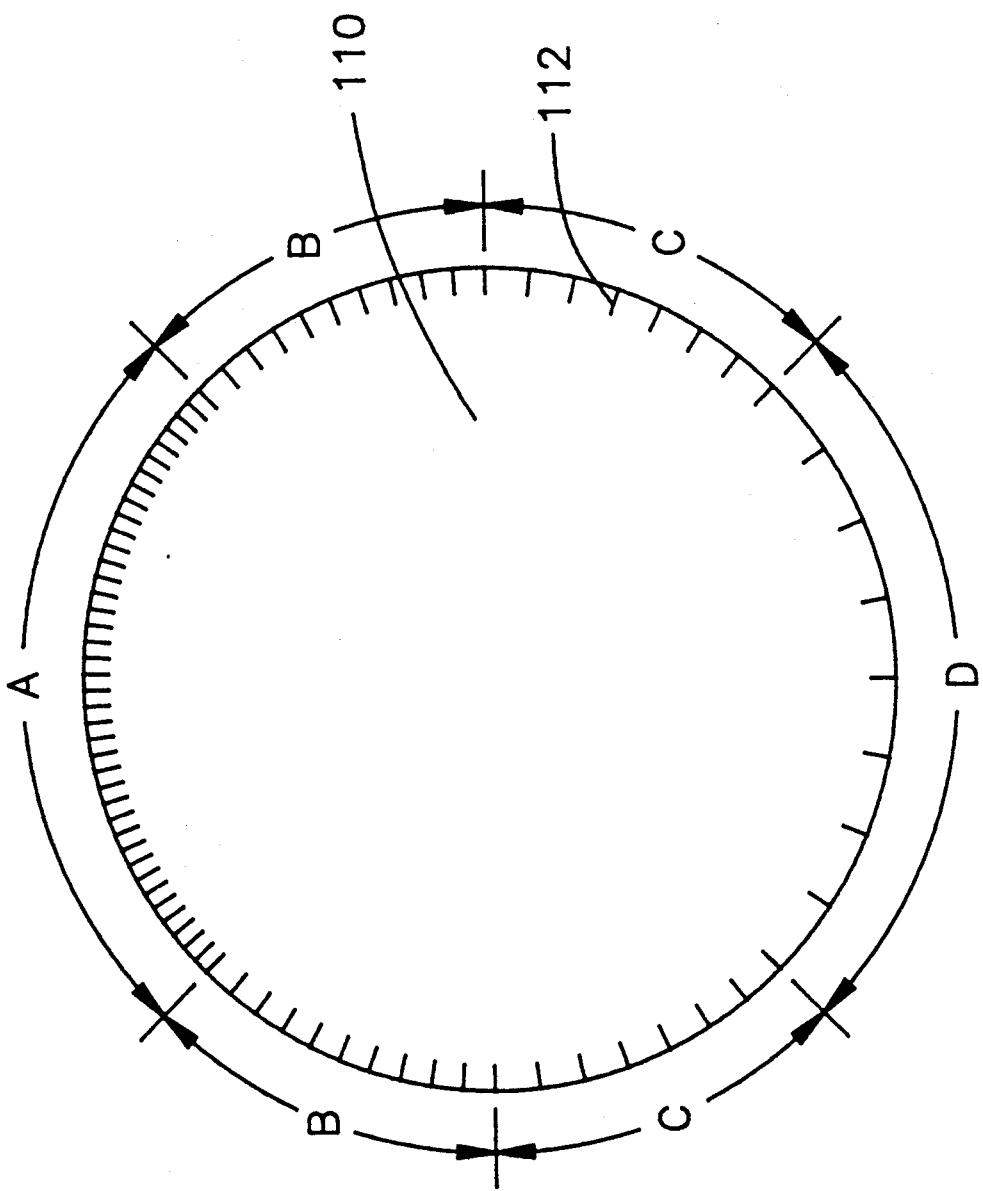
FIG. 5 is a top plan view of an optical disk having nonuniformly spaced apertures, according to an embodiment of the present invention.

In the description of the present invention, thus far, it has been assumed that the perturbations which activate the sensors are evenly spaced; however, such need not be the case and it may be advantageous in some cases to have variably pitched perturbations. FIG. 5 illustrates such a case in which a disk 110, intended for use, for example, with a steering column which rotates 180 degrees in either direction from the neutral position, has defined near the edge thereof a plurality of apertures, as at 112. It can be seen that apertures 112 are divided among six different regions with the pitch of the apertures in one region differing from the pitch of the apertures in the other regions. For example, the apertures in region "A" have a very short pitch, while the apertures in region "D" have a very long pitch, with the pitches of the apertures in regions "B" and "C" having intermediate pitches. When using two sensors (not shown), the sensors would be spaced according to the above formula at $[d] \times [(n) + (\frac{1}{2})]$, where d is the pitch of the apertures in the "D" region. Now, if the sensors are located at the lowermost portion of disk 110 and the disk, as oriented on FIG. 5, is at the neutral, or straight ahead, position of a steering column, for example, a relatively large rotational displacement of the steering column will be required to activate a power steering assist unit. However, if the column is rotated somewhat so that the sensors are aligned with one of the regions "C", a lesser rotational displacement will be required and, if the steering column is rotated almost halfway around so that the sensors are aligned with region "A", very little displacement will be required. Such an arrangement also helps in the discrimination of purposeful movement from random and vibration movement, as the latter is most likely to occur when the vehicle is moving along a straight path, with the sensors in region D. However, the more the steering column is turned, the more likely it is that the operator is purposefully moving the steering column, for example, to maneuver in a confined area. Because of the irrational progression from one region to the next, it may be desirable to provide one or more apertures at intermediate spacings in the transition region.

The description of the present invention, thus far, has assumed the use of two motion sensing elements; however, the invention is not limited to the use of two sensors and three or more sensors may be provided. The use of more than two sensors may be advantageous in two situations. In one situation, a relatively large number of sensors may be provided when the perturbations are widely spaced, such as when retrofitting to existing equipment, for example, and it is necessary that the maximum displacement be less than could be provided with only two sensors. In the other situation, three or more sensors may be provided to lower the maximum/minimum displacement ratio. If, for example, it were desired to have an activation range of from 8 to 10 degrees, or a ratio of 1.25:1, two sensors could not be used to produce that range because, as noted above, the minimum ratio achievable with two sensors is 2.00:1 and that only with sensors and perturbations of infinitesimal width. With multiple sensors, any desired ratio can be obtained as given by the following relationship:

$$\text{Max/Min Ratio} = \frac{Pn - n}{Pn - n - P}$$

Where, p=aperture pitch as a multiple of effective aperture width, and n=number of sensors spaced at equal intervals.

The sensors may also be spaced at integer intervals, as is the case with two sensors.

Referring again to the embodiment described above with reference to FIG. 3, wherein aperture disk 72 has an aperture pitch of 5, the use of two, three, or four sensors would yield maximum-to-minimum displacement ratios of 2.666, 1.714, or 1.454, respectively. Thus, the use of four equally spaced sensors with aperture disk 72 of FIG. 3 results in a maximum-to-minimum displacement ratio nearly half that achieved with two sensors.

Figure 6:
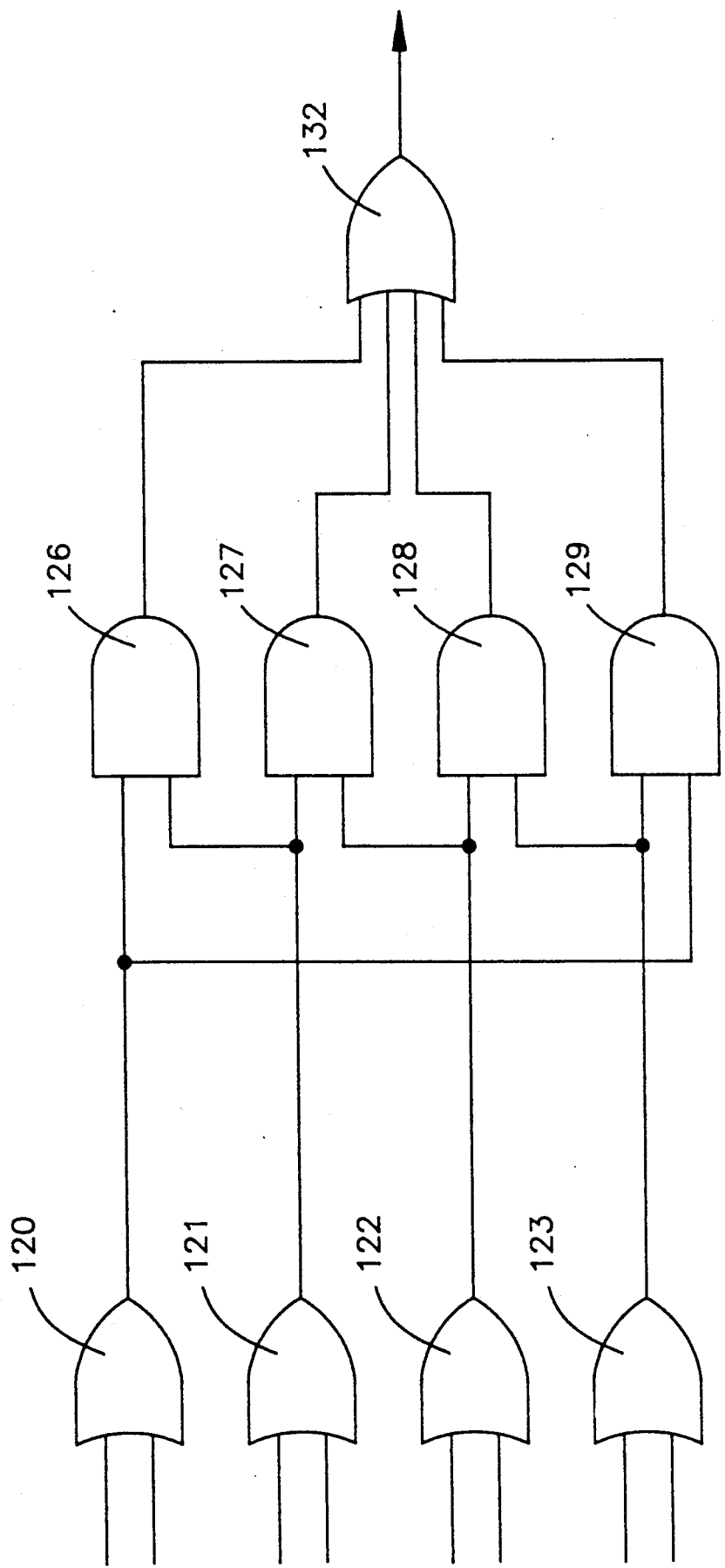
FIG. 6 illustrates the combinatorial logic for a timing system, according to the present invention, for use with four sensing elements.

FIG. 6 is a diagram showing the combinatorial logic in a timing system with multiple sensors, in this case four sensors. Here OR gates 120-123 have the same function as OR gates 54 and 60 on FIG. 2 and provide outputs indicating that first through fourth sensors (not shown) with which they are respectively associated have been activated. AND gates 126-129 have the same function as AND gate 62 on FIG. 3 and provide outputs to OR gate 132 the output of which indicates that the first and second, the second and third, the third and fourth, or the fourth and first sensors have been activated within a predetermined length of time.

A further variation with multiple sensors is to require that more than two be activated within a predetermined length of time.

Figure 7:
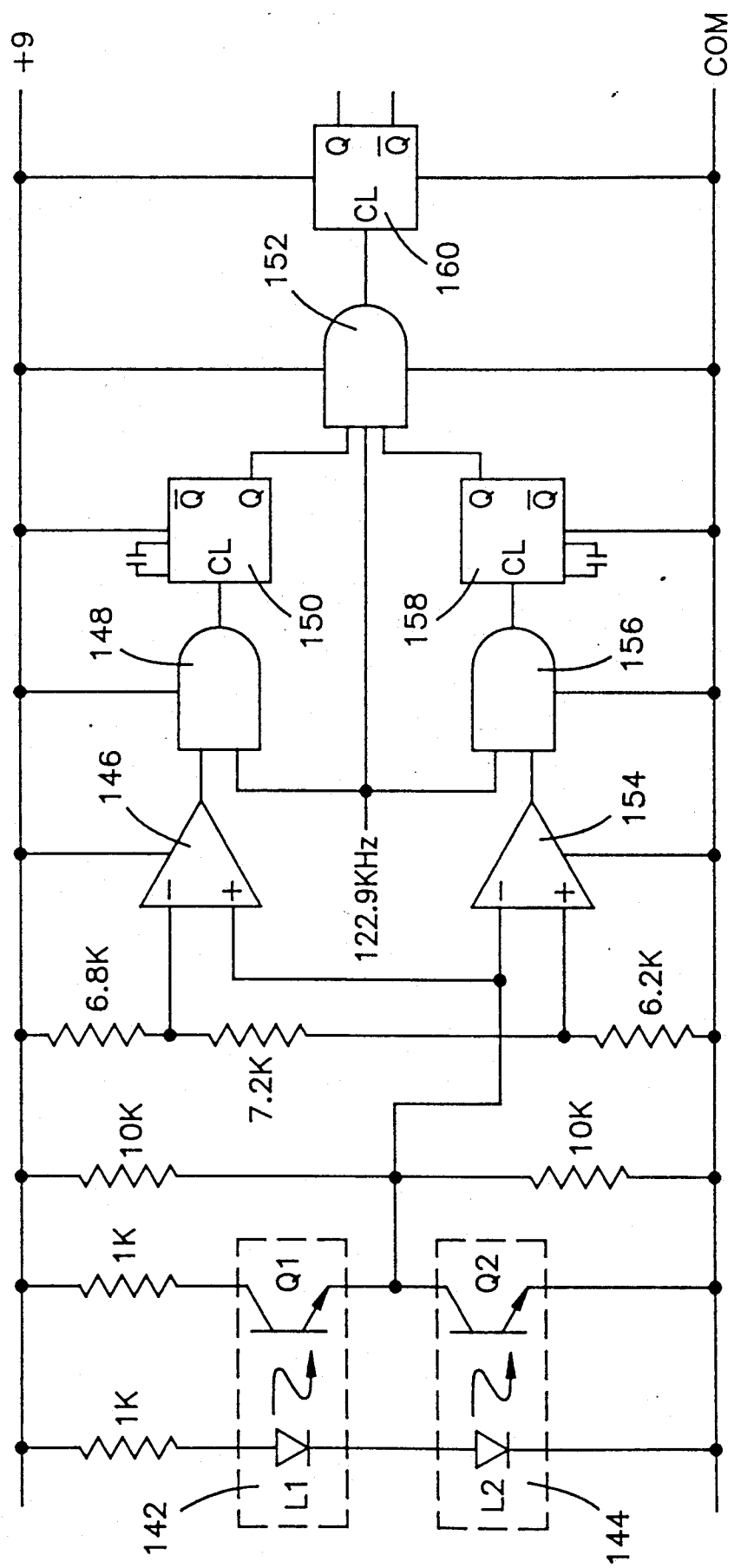
FIG. 7 is a schematic electrical diagram of a timing system, according to the present invention, for use with two sensors.

FIG. 7 is a schematic diagram showing a timing system suitable for use with two sensors in the embodiment described above for a forklift truck, generally indicated by the reference numeral 140, with sensors Q1 and Q2 being components of optical switches 142 and 144, respectively, which optical switches may be assumed to be aligned with a row of apertures such as the apertures of disk 72 (FIGS. 3 and 4). When Q1 conducts, thus indicating that an aperture is between L1 and Q1 of optical switch 142, the output of a comparator 146 goes to a logical "1," enabling an AND gate 148 which gates 122.9 KHz clock pulses to a single shot multivibrator 150 which in turn provides an input to an AND gate 152 for a first predetermined length of time. If during the first predetermined length of time, Q2 conducts, thus indicating that disk 72 has rotated a predetermined increment, the output of comparator 154 goes to a logical "1," enabling an AND gate 156 which gates the clock pulses to a single shot multivibrator 158 which in turn provides the third input to AND gate 152 for the remainder of the first predetermined length of time. AND gate 152 gates clock pulses to a single shot multivibrator 160 which provides an output signal for a second predetermined length of time, the output signal causing hydraulic power steering unit 94 (FIG. 4) to operate for the second predetermined length of time. If Q1 and Q2 both continue to conduct during increments of the first predetermined length of time, power steering unit 94 will continue to operate. If one of Q1 and Q2 fails to conduct during an increment of the first predetermined length of time, single shot multivibrator 160 will fail to be retriggered and power steering unit 94 will terminate operating at the end of the remainder of the second predetermined length of time.

In normal operation, Q1 and Q2 cannot conduct simultaneously because of the design of disk 72. However, to prevent short-circuiting of the power supply should disk 72 be removed when the system is activated, a 1-KOhm resistor is placed in series with Q1 and Q2.

In a preferred embodiment for a power steering assist of time might be on the order of about ½ to 1½ seconds and the second predetermined length of time might be on the order of about 3 to 30 seconds.

The clock rate can be any desired value compatible with the anticipated speed of mechanical operation, but should be sufficiently high that it "floods" the aperture, in order to predictably fill the aperture.

It is within the intent of the present invention that any type of sensor may be employed together with appropriate corresponding perturbations and, in addition to the microswitches and optical sensors described above for illustrative purposes only, the sensors may be pressure switches, reed switches, or conductive, inductive, or capacitive proximity sensors, or of any other type. Additionally, the optical sensors may be used with reflective perturbations.

It will thus be seen that the objects set forth above, among those made apparent from the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. An apparatus for determining the occurrence of at least a predetermined degree of motion within a predetermined length of time, comprising:
   (a) member means including a series of perturbations;
   (b) first and second motion sensing means activatable in response to said perturbations when said member means moves relative to said first and second motion sensing means, said first and second motion sensing means disposed such that said first and second motion sensing means are not activatable concurrently; but, when both first and second motion sensing means are activated, such activation indicates that said at least a predetermined degree of motion has occurred; and
   (c) timing means to determine if said first and second motion sensing means are both activated within said predetermined length of time.

2. An apparatus, as defined in claim 1, wherein said member means moves rotatingly.

3. An apparatus, as defined in claim 1, wherein said member means moves rotatingly.

4. An apparatus, as defined in claim 1, wherein said member means comprises an aperture disk, said perturbations comprise apertures defined therethrough, and said first and second motion sensing means comprise optical switches.

5. An apparatus, as defined in claim 1, wherein said perturbations are divided among two or more groups, with said perturbations in one group having a pitch different from that of said perturbations in another group.

6. An apparatus, as defined in claim 1, wherein said timing means comprises:
   (a) first memory means responsive to said first motion sensing means and operable therefrom to produce a first output signal for a first predetermined length of time after said first motion sensing means is activated;
   (b) second memory means responsive to said second motion sensing means and operable therefrom to produce a second output signal for said first predetermined length of time after said second motion sensing means is activated; and
   (c) first output means to receive as inputs said first and second output signals from said first and second memory means and to provide a third output signal whenever said first and second output signals are concurrent.

7. An apparatus, as defined in claim 6, wherein said timing means further comprises:
   (d) third memory means responsive to said first output means and operable therefrom to produce a fourth output signal for a second predetermined length of time after receiving said third input signal.

8. An apparatus, as defined in claim 7, wherein said fourth output signal is used to activate a power steering assist unit.

9. An apparatus, as defined in claim 6, wherein said third output signal is used to activate a power steering assist unit.

10. A power steering system, comprising:
    (a) rotatable steering column;
    (b) a power steering assist unit operably connected to said steering column to assist the turning thereof when said power steering assist unit is activated;
    (c) an aperture disk fixedly attached to said steering column in a plane perpendicular to the axis of said steering column, said aperture disk having defined therethrough a series of spaced apart apertures;

(d) first and second optical switches fixedly mounted with respect to the rotation of said steering column and activatable in response to said apertures when said aperture disk moves relative to said first and second optical switches, said first and second optical switches disposed such that said first and second optical switches are not activatable concurrently; but, when both said first and second optical switches are activated, such activation indicates that said aperture disk has moved at least a predetermined distance; and (e) timing means to determine if said first and second optical switches are both activated within said predetermined length of time and to cause said power steering assist unit to activate when said first and second optical switches are so activated.

11. A system, as defined in claim 10, wherein said timing means comprises:
(a) first memory means responsive to said first optical switch and operable therefrom to produce a first output signal for a first predetermined length of time after said first optical switch is activated;
(b) second memory means responsive to said second optical switch and operable therefrom to produce a second output signal for said first predetermined length of time after said second optical switch is activated; and
(c) first output means to receive as inputs said first and second output signals from said first and second memory means and to provide a third output signal whenever said first and second output signals are concurrent.

12. A system, as defined in claim 11, wherein said timing means further comprises:
(d) third memory means responsive to said first output means and operable therefrom to produce a fourth output signal for a second predetermined length of time after receiving said third input signal.

13. A method for determining the occurrence of a predetermined degree of motion within a predetermined length of time, comprising:
(a) providing member means including a series of perturbations;
(b) providing first and second motion sensing means activatable in response to said perturbations when said member means moves relative to said first and second motion sensing means, said first and second motion sensing means disposed such that said first and second motion sensing means are not activatable concurrently; and
(c) providing a first output signal for a first predetermined length of time after said first motion sensing means is activated;
(b) providing a second output signal for said first predetermined length of time after said second motion sensing means is activated; and
(c) providing a third output signal whenever said first and second output signals are concurrent.

14. A method, as defined in claim 13, further comprising:
(d) providing said third output signal for a second predetermined length of time.

15. A method, as defined in claim 14, wherein said fourth output signal is used to activate a power steering assist unit.

16. A method, as defined in claim 13, wherein said member means moves linearly.

17. A method, as defined in claim 13, wherein said member means moves rotatingly.

18. A method, as defined in claim 13, wherein said member means comprises an aperture disk, said perturbations comprise apertures defined therethrough, and said first and second motion sensing means comprise optical switches.

19. A method, as defined in claim 13, wherein said perturbations are divided among two or more groups, with said perturbations in one group having a pitch different from that of said perturbations in another group.

20. A method, as defined in claim 13, wherein said third output signal is used to activate a power steering assist unit.

21. An apparatus for determining the occurrence of a predetermined degree of motion within a predetermined length of time, comprising:
(a) member means including a series of perturbations;
(b) first and second motion sensing means activatable in response to said perturbations when said member means moves relative to said first and second motion sensing means, said first and second motion sensing means disposed such that said first and second motion sensing means are not activatable concurrently; and
(c) timing means to determine if said first and second motion sensing means are both activated within said predetermined length of time, said timing means comprising:
(i) first memory means responsive to said first motion sensing means and operable therefrom to produce a first output signal for a first predetermined length of time after said first motion sensing means is activated;
(ii) second memory means responsive to said second motion sensing means and operable therefrom to produce a second output signal for said first predetermined length of time after said second motion sensing means is activated; and
(iii) first output means to receive as inputs said first and second output signals from said first and second memory means and to provide a third output signal whenever said first and second output signals are concurrent.

22. An apparatus, as defined in claim 21, wherein said timing means further comprises:
(iv) third memory means responsive to said first output means and operable therefrom to produce a fourth output signal for a second predetermined length of time after receiving said third input signal.

23. An apparatus, as defined in claim 22, wherein said fourth output signal is used to activate a power steering assist unit.

24. An apparatus, as defined in claim 21, wherein said third output signal is used to activate a power steering assist unit.

25. A power steering system, comprising:
(a) rotatable steering column;
(b) a power steering assist unit operably connected to said steering column to assist the turning thereof when said power steering assist unit is activated;
(c) an aperture disk fixedly attached to said steering column in a plane perpendicular to the axis of said steering column, said aperture disk having defined therethrough a series of spaced apart apertures;

(d) first and second optical switches fixedly mounted with respect to the rotation of said steering column and activatable in response to said apertures when said aperture disk moves relative to said first and second optical switches, said first and second optical switches disposed such that said first and second optical switches are not activatable concurrently; and (e) timing means to determine if said first and second optical switches are both activated within said predetermined length of time and to cause said power steering assist unit to activate when said first and second optical switches are so activated, said timing means comprising:

(i) first memory means responsive to said first optical switch and operable therefrom to produce a first output signal for a first predetermined length of time after said first optical switch is activated;

(ii) second memory means responsive to said second optical switch and operable therefrom to produce a second output signal for said first predetermined length of time after said second optical switch is activated; and (iii) first output means to receive as inputs said first and second output signals from said first and second memory means and to provide a third output signal whenever said first and second output signals are concurrent.

26. A system, as defined in claim 25, wherein said timing means further comprises:

(iv) third memory means responsive to said first output means and operable therefrom to produce a fourth output signal for a second predetermined length of time after receiving said third input signal.

* * * * *